No. 713,744. Patented Nov. 18, 1902.
C. G. BURKE.
TELEPHONE SYSTEM.
(Application filed May 23, 1901.)
(No Model.)
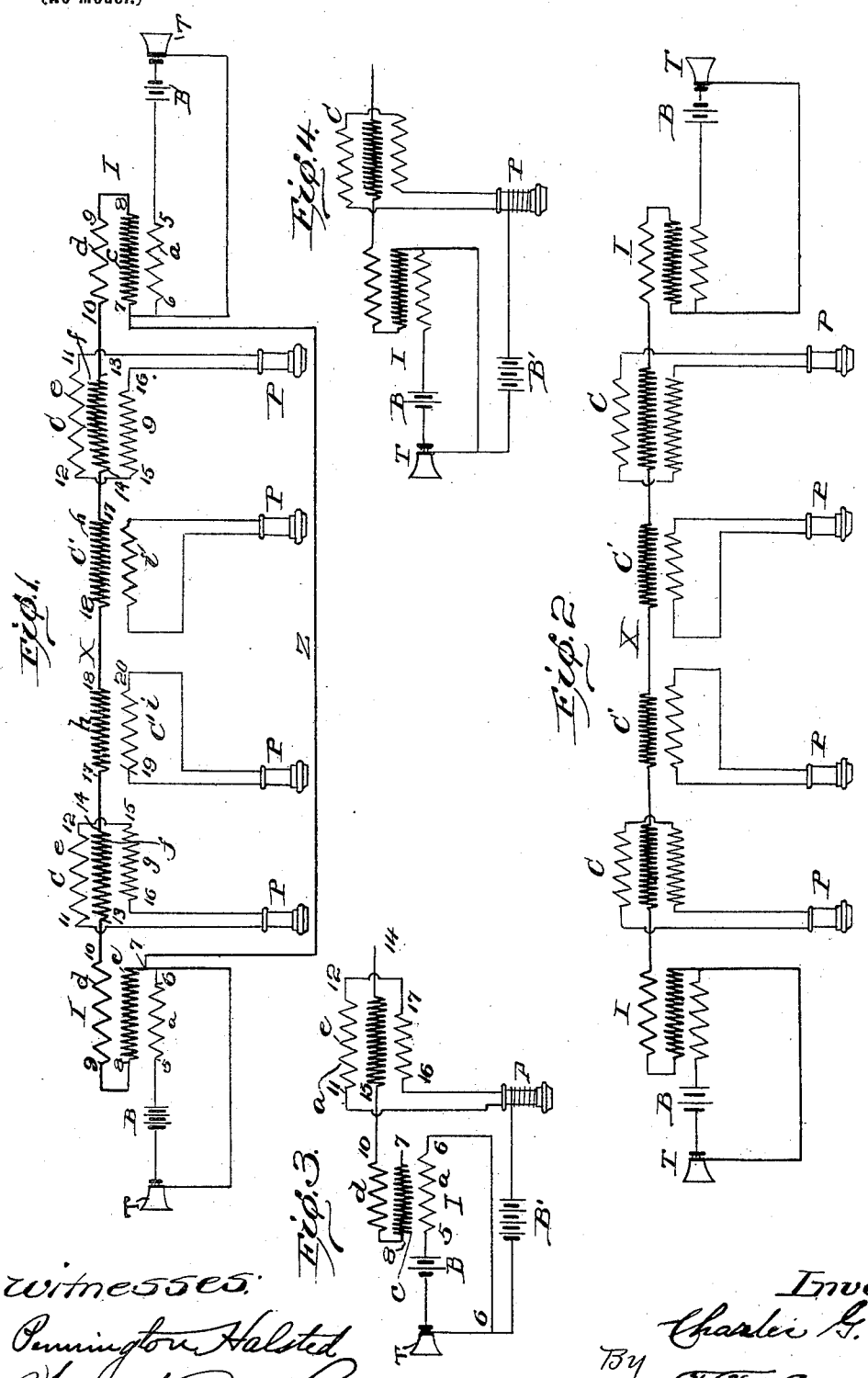

UNITED STATES PATENT OFFICE.

CHARLES G. BURKE, OF BROOKLYN, NEW YORK, ASSIGNOR OF ONE-HALF TO JOHN Q. A. WHITTEMORE, OF BOSTON, MASSACHUSETTS.

TELEPHONE SYSTEM.

SPECIFICATION forming part of Letters Patent No. 713,744, dated November 18, 1902.

Application filed May 23, 1901. Serial No. 61,501. (No model.)

*To all whom it may concern:*

Be it known that I, CHARLES G. BURKE, a citizen of the United States, residing at the borough of Brooklyn, in the county of Kings and State of New York, have invented certain new and useful Improvements in Telephone Systems, of which the following is a specification, reference being had to the drawings accompanying and forming a part of the same.

The improvements which form the subject of my present application pertain more particularly to that branch of electrical engineering which concerns the organization and operation of normally uncharged electric systems or circuits comprising a conductor and instrumentalities directly or inductively connected therewith which are capable by their operation of causing electric action in such systems or circuits. An example of these is found in an ordinary telephone-line, and it is to such a system that my present invention particularly relates.

The object of the invention is, primarily, to secure a higher efficiency in operating telephone systems generally, and especially those in which the line conductor is a single or ungrounded wire; and it consists in arranging the instrumentalities employed in the system in the special manner hereinafter more fully described.

The invention also consists in the novel features the more important of which are realized by connecting the circuit of the transmitter, transmitting-battery, and primaries of the operating induction-coils with the line and also by connecting one terminal of an accumulator of electrical energy, such as a secondary battery, with the local circuit of the operating-battery, transmitter, and primaries of the induction-coil and the other terminal of the independent battery to some other accumulator or reservoir of electricity.

In carrying out these improvements I employ the usual transmitters, transmitting-batteries, and induction-coils at opposite ends of the line; but in addition thereto I preferably use one or more transforming-coils at each station and two magneto-telephones as a receiver, which are connected up in the low-potential or coarse-wire winding of the transformers.

In practice I find it an advantage to have an extra coil or winding on the induction-coils used in connection with the transmitter for developing the high-potential pulsations in the line and also in those which transform the line pulsations with the low-potential pulsations which operate the receivers. These extra coils or windings preferably differ from the main windings in number of convolutions and resistance, being less in each case; but they are wound in the same direction. I find, moreover, that to receive the highest efficiency it is important to connect up in an exactly corresponding order at each end of the line the transmitters, batteries, induction-coils, and transformers to connect the telephone-receivers to the locals of the transformers at both ends of the line by corresponding terminals and to connect the line wire or wires at each end of the system to corresponding terminals of the secondaries included therein, the several coils in each case being connected together by their opposite terminals. By this arrangement the line as a whole may be regarded as composed of two sections, all the instruments in each section being connected together in series by opposite terminals, while the sections themselves are connected to one another through the line by like terminals. From this it will be seen that any number of coils may be included in a section so long as this order of their mutual connections is observed, but that the complete line or circuit has but two sections, which, however, compose but a single complete organization. In this respect the two line-sections may be regarded as somewhat resembling the two bobbins of a neutral electromagnet, both tending to mutual coöperation and to the effecting of a common purpose whatever may be the direction of the operating-current.

In the drawings which illustrate the improvements above and hereinafter referred to, Figure 1 is a diagram of a telephone circuit or line and of the windings and connections of the instrumentalities employed in carrying out my invention. Fig. 2 is a similar diagram showing the arrangement employed in the case of a single ungrounded line conductor. Figs. 3 and 4 are diagrams illustrating modifications of the system shown in Fig. 2.

As the several instruments, their windings, connections, and mutual relations to each other and to the line are identical in the two sections similar letters and figures of reference are used to indicate corresponding parts and terminal connections at each end of the line.

Referring first to Fig. 1, T T designate the usual microphone-transmitters; B B, the transmitting-batteries; I I, the induction-coils; C C, transformers or converters, and P P, the telephone-receivers.

The induction-coils I have three coils or windings $a\ c\ d$, the first named being of low resistance and included directly in the battery-circuit, the second of fine wire with many turns, and the third of few turns, preferably of coarse wire, in series with the second or coil $c$. The specific arrangement of these three coils may be varied—that is to say, both coils $c\ d$ may surround the coil $a$ or the latter may be interposed in various ways between the other two.

The line of transformers C C' are associated with the receivers P P at their particular stations. These receivers are shown below the return-line Z in Fig. 1 and directly below its associated coil in said figure and in the other figures to avoid confusion of the connections desired to be illustrated. Coil C', with its receiver, may be located at the same station with coil C and its receiver or at a distant station. In practical working it is of course located at a remote station. The line-transformers C have also three windings $e\ f\ g$, the coil $f$ being of fine wire of many turns and the coils $e\ g$ of coarse wire of few turns, the coil $e$ being preferably of fewer turns than the coil $g$, with which it is connected in series. The same remarks as to the disposition of these three coils made above applies to the transformer C.

When a second transformer C' is used for operating an additional telephone for the receiver, it may have but two coils $h\ i$, as in the ordinary instruments of this class. Assuming that all of the coils are wound in the same direction, the start or beginning of each winding may be designated as the "in" and the end of the winding as the "out" terminal. The arrangement of connections, therefore, will be as follows: One pole of the battery B is connected directly to the in terminal 5 of the coil $a$ and the other to the out terminal 6 through the transmitter. The in and the out terminals of the coil $c$ are indicated by the numerals 7 and 8, respectively, and the corresponding terminals of coil $d$ by 9 and 10, respectively. The in terminal 7 of coil $c$ is connected in the form shown in Figs. 1, 2, and 4 to the transmitter-circuit at a point between the transmitter and the primary coil $a$. The out terminal 8 of coil $c$ is connected to the in terminal 9 of coil $d$. This coil $d$ is in turn connected either to the line or through an induction-coil of the receiver-circuit. Coils $c$ and $d$ are therefore connected in series with each other and unite to transform the varying current of the transmitter-circuit to corresponding currents in the ungrounded single main line X in the systems illustrated in Figs. 2, 3, and 4. These coils also produce a like effect in the complete main-line circuit X Z. (Illustrated in Fig. 1.) The out terminal 10 of coil $d$ is connected with the in terminal 13 of coil $f$, and the out terminal 14 of the latter connects the in terminal 17 of coil $h$, the out terminal 18 of which is connected to line. In the coil $e$ 11 and 12 indicate the in and out terminals, respectively, the corresponding terminals in coil $g$ being designated by 15 and 16 and in coil $i$ by 19 and 20.

The coils $c$ and $b$ of the transformers I and the coils $e$ and $g$ of the transformers C are, so far as concerns their transformer functions, wound and connected to assist each other—that is, so that the number of the affective ampere-turns of the secondary as a whole is in each case the sum of the ampere-turns of the two coils.

The main line or circuit may be traced from either line or section of the system as follows: Beginning at the terminal 7 of the coil or winding $c$ of either of the induction-coils I it passes through coil $c$ by the out terminal 8 to the in terminal 9 of coil $d$, from the out terminal 10 of the latter to the in terminal 13 of coil $f$, from the out terminal 14 to the in terminal 17 of coil $h$, and thence to line X and to the correspondingly-arranged instruments at the other end. When a complete circuit is used, the terminals 7 are grounded or connected by a return-wire Z.

In order to secure the best results with the system as thus described, I find that the telephone-receiver should be connected up in the following manner: The in terminals of the receiver-coils—that is, the terminal of the coil of the receiver first wound on the receiver-magnet or the beginning of the winding of the coils—should be connected to the in terminal of the local circuit by which the receiver is to be operated. The clearness of enunciation produced in a telephone-receiver having a single positive or north pole presented to the diaphragm and connected in the manner just stated is particularly noticeable. When bipolar receivers are employed, the in terminal of the local circuit should be connected up to the terminal of that coil which surrounds the positive or north pole of the receiver. The mutual coöperation and coaction of the instrumentalities at both ends of a line organized in this way is made manifest by a very greatly-increased loudness and clearness of the voice as reproduced in the receivers compared with the reproduction on ordinary telephone-circuits. It is also proved by the fact that under this arrangement the reproduction of articulate speech is rendered practicable and feasible on lines which heretofore could not be used for this purpose—as, for example, over a line in which one of the wires has become broken or which had been primarily constructed with but a single ungrounded wire. Such a line is illustrated in Fig. 2, which differs from Fig. 1 only in the omission of the wire Z, which in the case of a complete metallic circuit connects the in terminals 7 of the two coils $a$ of the induction-coils I I. I have found, however, that when a single ungrounded line is employed an improved effect is produced by connecting to the local circuit containing the transmitter T and battery B one pole of a second battery B', and the other pole of which is connected to a body of considerable capacity. A convenient way of accomplishing this is to connect the battery-wire onto a metallic sleeve or coil of wire on the telephone-receiver, so that when the latter is held in the hand the body will form the capacity terminal for the battery B'. When this is done, the line may be connected electrically with the local circuit, as in Fig. 4, or it may be entirely disconnected therefrom, as in Fig. 3.

Having now described my invention, what I claim is—

1. In a telephone system the combination with a circuit composed of two sections, of a plurality of induction-coils in each section, a telephone-receiver inductively connected to one of said coils, a transmitter-circuit inductively connected to another of said coils, the coils in each section being connected together in series by unlike terminals and the two groups or series being connected through the line by like terminals, as set forth.

2. In a telephone system, the combination with a single or ungrounded main-line conductor composed of two sections, of local transmitting-circuits and local receiving-circuits for each section, a plurality of induction-coils consisting of fine-wire coils included in the main line and coarse-wire coils included in the local circuits, respectively, transmitters and batteries in the local transmitting-circuits and magneto-receivers in the local receiving-circuits, the coils of the several transformers of each section being connected in series by unlike terminals, and the two groups or series being connected through the main line by like terminals, as set forth.

3. In a telephone system, the combination with a main line composed of a single or ungrounded conductor, of local transmitting-circuits and local receiving-circuits, induction-coils consisting of fine-wire coils included in the main line and coarse-wire coils included in the locals respectively, transmitters and batteries in the local transmitting-circuits and magneto-telephones in the local receiving-circuits, accumulators of electricity connected with the local circuits as set forth.

4. In a telephone system a single ungrounded main line, transmitter-circuits located at each end of the line, induction-coils for transforming pulsating currents in said transmitting-circuits to corresponding currents of high potential in said main line, a plurality of receiving-circuits each having a telephone-receiver and induction-coils for transforming currents on a line to corresponding currents of a low potential in the said receiver-circuit.

5. In a telephone system a single ungrounded main line, a primary of an induction-coil, a transmitter and a battery in a closed local circuit, a secondary of said induction-coil connected at one end directly to the terminal of the primary coil and at the other end to the said main line, a primary of a second induction-coil connected in series to the line, a secondary coil of said second induction-coil, and a telephone-receiver connected to the said second induction-coil and forming a closed circuit therewith, whereby speech may be transmitted along the said single ungrounded main line.

6. In a telephone system the combination of a closed local circuit, a telephone-receiver, a battery having one terminal connected to said circuit, and another terminal connected to a coil surrounding the said receiver, means for transforming pulsating currents of the closed local circuit to corresponding currents of high potential in a secondary circuit, and means connected to the telephone-receiver for transforming pulsating currents of said secondary circuit to corresponding currents of low potential.

7. In a telephone system a single ungrounded main line, a telephone transmitter-circuit, and a receiver located at one end of said main line, a coil surrounding the said receiver and a battery connected between a point in the said transmitter-circuit and one terminal of the coil on the receiver, means for transforming the currents of the transmitter-circuit to the currents of high potential on the single ungrounded main line, and means for transforming the pulsating currents to corresponding currents of low potential in the receiver-circuit.

8. In a telephone system a single ungrounded main line, telephone transmitter-circuits located at each end of the said main line, transformer-coil in series with the said main line, and a plurality of receivers located near the ends of the said main line and at intermediate points along the said main line, a second set of transformers connected to each of the telephone-receivers whereby pulsating currents produced in the transmitter-circuit will be transformed to currents of high potential in the main line and retransformed to currents of low potential in the receiver-circuits.

9. In a telephone system the combination of a closed transmitter-circuit, a secondary of an induction-coil located in the said transmitter-circuit having a fine-wire coil and a coarse-wire coil in series with each other and with the main line, receivers and transformer located at other points of the said main line, said transformer having two coarse-wire coils connected in series with each other, a second transmitter-circuit located at another point in the main line and connected to a transformer, said transformer having a coarse-wire coil and a fine-wire coil in series with each other and in series with the said main line, substantially as described.

CHARLES G. BURKE.

Witnesses:
BENJAMIN MILLER,
RICHARD DONOVAN.